C. Mather,
Well Borer and Reamer.
Nº 57,828. Patented Sep. 4, 1866.
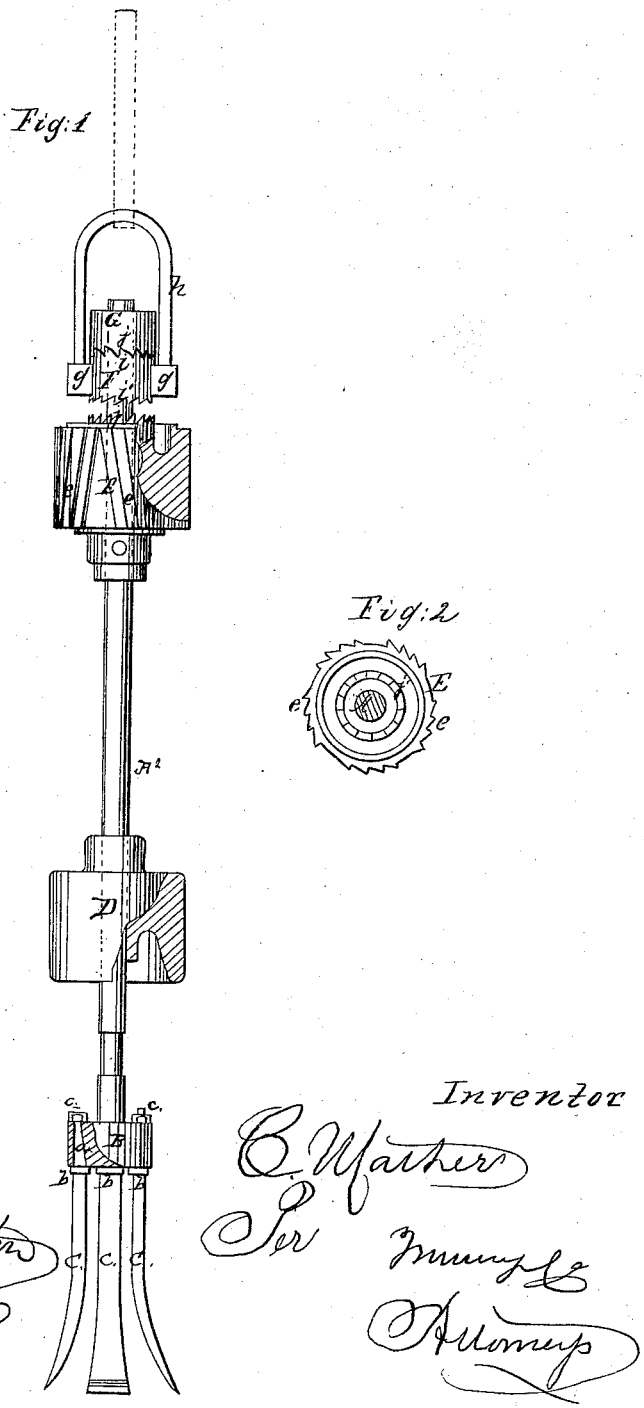

UNITED STATES PATENT OFFICE.

COLIN MATHER, OF MANCHESTER, ENGLAND, ASSIGNOR TO CHARLES P. BUTTON, OF NEW YORK CITY.

IMPROVEMENT IN DRILLS FOR BORING WELLS.

Specification forming part of Letters Patent No. 57,828, dated September 4, 1866.

*To all whom it may concern:*

Be it known that I, COLIN MATHER, of Manchester, England, have invented a new and useful Improvement in Drills for Boring Wells, &c.; and I do hereby declare that the following is a full, clear, and exact description thereof, which will enable those skilled in the art to make and use the same, reference being had to the accompanying drawings, forming part of this specification, in which—

Figure 1 represents a sectional side elevation of this invention. Fig. 2 is a horizontal section of the same.

Similar letters of reference indicate corresponding parts.

This invention relates to a drill the cutting part of which is composed of a series of flaring cutters or chisels, secured in a suitable head in such a manner that a hole of considerable diameter can be bored, and that the cutters can be readily kept in order, each of the chisels being made so that it can be removed independent of the others and sharpened or replaced by a new one at short notice and with but little loss of time or expense.

On the boring-bar is secured a guide-cylinder and a reamer, which serves to clear out the hole and to assist in turning the drill after each blow. A sleeve is fitted on the upper part of the drill-rod and provided with ratchet-teeth on both its edges, which alternately come in gear with two circular ratchet-racks, one above and the other below said sleeve, and placed in such a position that the teeth of one rack are opposite the cavities in the other rack, and vice versa. By the action of the sleeve on the toothed racks a positive intermittent rotary motion is imparted to the drill-rod, and the operation of drilling is materially facilitated.

A represents the drill-rod, to the lower end of which is firmly secured the head B. This head is perforated with a series of square tapering holes, $a$, to receive the shanks of the chisels or cutters C, which are provided with shoulders $b$ below the head, and with nuts $c$ above, so that they can be securely fastened to the same, and also removed from it, whenever it may be desirable. Each chisel can thus be readily sharpened or replaced by another whenever it may be desired.

The lower ends of the chisels are flaring or turned outward, so that a hole of considerable diameter can be cut with a comparatively simple and cheap drill.

A guide-cylinder, D, is fastened to the drill-rod a little above the cutter-head, and this cylinder serves also to increase the force of the blow by its momentum. The diameter of this cylinder is equal, or nearly so, to the hole to be bored. Another cylinder, E, is secured to the drill-rod, near the top end of the same. This cylinder is provided with a series of teeth, $e$, on its circumference, which are inclined partially in one and partially in an opposite direction, as clearly shown in Fig. 1 of the drawings.

The diameter of the cylinder E is somewhat larger than the hole opened by the drill, so that the teeth $e$ cut into the ground and assist in imparting to the drill-rod a partial revolving motion, and at the same time the hole is reamed out and rendered smooth and even from top to bottom.

Close to the upper end of the drill-rod, and at a short distance above the cylinder or reamer E, is another cylindrical head, G, and between the reamer E and head G moves the sleeve F, which is furnished with two arms or lugs, $g$, to sustain the bail $h$. This bail serves to connect the drill to the drill-rope. The sleeve F is provided with two sets of ratchet-teeth, $i\ i'$, one above and the other below, and pointing in one and the same direction, and these ratchet-teeth are alternately thrown in gear with circular ratchet-racks $j\ j'$, one of which is cut in the upper edge of the reamer E and the other in the lower edge of the head G, and which are placed in such relation to each other that the teeth of one rack are opposite the depressions in the opposite rack, and vice versa.

As the cutters strike the ground the sleeve F moves down, and its lower set of ratchet-teeth, $i'$, gear into the rack $j'$, and a partial revolving motion is imparted to said sleeve. On raising the drill the upper set of teeth, $i$, of the sleeve is thrown in gear with the rack $j$ on the head G, and a partial revolving motion is imparted to the drill. The effect of this mechanism is increased by suspending the drill from a flat rope instead of from a round rope, as usual.

With a drill of this description holes of a much larger diameter can be bored than with drills of the ordinary construction, and the operation of drilling is rendered comparatively easy.

What I claim as new, and desire to secure by Letters Patent, is—

1. The reamer E, in combination with the drill-rod A and cutters C, constructed and operating substantially as and for the purpose set forth.

2. The sleeve F, with ratchet-teeth $i$ $i'$, in combination with the circular racks $j$ $j'$ and drill-rod A, constructed and operating substantially as and for the purpose described.

COLIN MATHER.

Witnesses:
WM. MATHER,
M. B. PAYNE.